US005502612A

United States Patent [19]

Osterhout et al.

[11] Patent Number: 5,502,612

[45] Date of Patent: Mar. 26, 1996

[54] SECONDARY SURGE ARRESTER WITH ISOLATING AND INDICATING FEATURES

[75] Inventors: Joseph C. Osterhout, Lockport; Steven P. Hensley, Geneva; Alex Demetzensky, Berwyn; Howard E. Swanson, Chicago, all of Ill.

[73] Assignee: Joslyn Manufacturing Company, Franklin Park, Ill.

[21] Appl. No.: 193,227

[22] Filed: Feb. 7, 1994

Related U.S. Application Data

[63] Continuation-in-part of Ser. No. 911,669, Jul. 8, 1992, abandoned.

[51] Int. Cl.$^{6}$ ........ H02H 7/04

[52] U.S. Cl. ........ 361/117; 361/118; 361/127

[58] Field of Search ........ 361/120, 118, 361/123, 124, 119, 127

[56] References Cited

U.S. PATENT DOCUMENTS

| | | | |
|---|---|---|---|
| 3,452,252 | 6/1969 | Mapham | 317/16 |
| 3,803,524 | 4/1974 | Schmalz et al. | 337/28 |
| 4,223,366 | 9/1980 | Sweetana, Jr. et al. | 361/127 |
| 4,506,310 | 3/1985 | Schwarz | 361/104 |
| 4,649,457 | 3/1987 | Talbot et al. | 361/127 |
| 4,710,847 | 12/1987 | Kortschinski et al. | 361/125 |
| 4,907,119 | 3/1990 | Allina | 361/56 |
| 4,930,039 | 5/1990 | Woodworth et al. | 361/127 |

OTHER PUBLICATIONS

Wahl Instruments, Inc., *Temperature Measurement Instruments,* pp. 34–36, 1984.
Joslyn Electronic Systems Co., *Joslyn Technical Data,* Surge Suppressor, Model 1203–03 (Sep. 1992).
Joslyn Electronic Systems Co., *Joslyn Technical Data,* Medium–Duty Surge Suppressors, Model 1250–32, Model 1250–32–E, Model 1250–33 (May 1991).
Joslyn Electronic Systems Co., *Joslyn Technical Data,* Surge Arrester, 1250–39 (Dec. 1990).
Joslyn Electronic Systems Co., *Joslyn Technical Data,* Surge Arrester, 1250–43 (Apr. 1992).
Joslyn Electronic Systems Co., *Joslyn Technical Data,* AC Arrester, 1250–45–E (Dec. 1991).
Joslyn Electronic Systems Co., *Joslyn Technical Data,* AC Surge Protector Surgitron® III, Model 1260–11 (Jun. 1992).
Joslyn Electronic Systems Co., *Joslyn Technical Data,* AC Surge Protector Surgitron® II, Model 1260–41 (Aug. 1992).
Joslyn Electronic Systems Co., *Joslyn Technical Data,* Surge Arrester, 1260–30 (Mar. 1991).
Joslyn Electronic Systems Co., *Joslyn Technical Data,* Surge Suppressor, 1260–31 (Mar. 1991).
Joslyn Electronic Systems Co., *Joslyn Technical Data,* AC Surge Protector Surgitron® I, Model 1260–87 (Nov. 1992).
Joslyn Electronic Systems Co., *Joslyn Technical Data,* Surge Arrestor, 1262–30 (Mar. 1991).

(List continued on next page.)

*Primary Examiner*—A. D. Pellinen
*Assistant Examiner*—Sally C. Medley
*Attorney, Agent, or Firm*—Marshall, O'Toole, Gerstein, Murray & Borun

[57] ABSTRACT

A secondary surge arrester has a line conductor and a ground conductor extending through a casing. A nonlinear voltage dependent resistive element and a fault current limiting fuse are connected between the conductors and are disposed within the casing. The fault current limiting fuse includes a fusible material surrounded by sand. The sand also surrounds the nonlinear voltage dependent resistive element. A heat sensitive material is disposed in close proximity to the fusible material and is viewable through a transparent cover. In the event of a failure of the nonlinear voltage dependent resistive element causing arcing, the fusible material fuses to open the current path between the conductors, and the sand absorbs energy by transforming state. Thus, the fault current limiting fuse limits current flow through the surge arrester and extinguishes the arc within the surge arrester so as to prevent violent fragmentation of the casing. Furthermore, the heat sensitive material changes in response to heat generated during failure of the nonlinear voltage dependent resistive element to indicate the operability of the secondary surge arrester.

22 Claims, 6 Drawing Sheets

OTHER PUBLICATIONS

Joslyn Electronic Systems Co., *Joslyn Technical Data,* AC Surge Protector Surgitron® III, Model 1265–11 (Nov. 1992).
Joslyn Electronic Systems Co., *Joslyn Technical Data,* AC Surge Protector Surgitron® III, Model 1265–33 (Aug. 1992).
Joslyn Electronic Systems Co., *Joslyn Technical Data,* AC Surge Protector Surgitron® I, Model 1265–40 (Nov. 1992).
Joslyn Electronic Systems Co., *Joslyn Technical Data,* AC Surge Protectors Surgitron® II, Model 1265–41, Model 1455–41 (Jan. 1992).
Joslyn Electronic Systems Co., *Joslyn Technical Data,* AC Surge Protectors Surgitron®II, Model 1265–41–R (Dec. 1992).
Joslyn Electronic Systems Co., *Joslyn Technical Data,* AC Surge Protector Surgitron® I, Model 1265–80 (Nov. 1992).
Joslyn Electronic Systems Co., *Joslyn Technical Data,* AC Surge Protector Surgitron® I, Model 1265–85 (Dec. 1992).
Joslyn Electronic Systems Co., *Joslyn Technical Data,* AC Surge Protector, 1265–88 (Aug. 1992).
Joslyn Electronic Systems Co., *Joslyn Technical Data,* Surge Protector, 1265–88–A (Oct. 1992).
Joslyn Electronic Systems Co., *Joslyn Technical Data,* Plug–In Surge Suppressor, 1270–04 (Jan. 1991).
Joslyn Electronic Systems Co., *Joslyn Technical Data,* Surge Suppressor, 1452–41 (Mar. 1991).
Joslyn Electronic Systems Co., *Joslyn Technical Data,* Surgitron® Secondary Arrestor, Model 1454–01 (Sep. 1992).
Joslyn Electronic Systems Co., *Joslyn Technical Data,* AC Surge Protectors Surgitron® III, Model 1455–11 (May 1992).
Joslyn Electronic Systems Co., *Joslyn Technical Data,* AC Surge Protector Surgitron®, Model 1455–19 (Feb. 1992).
Joslyn Electronic Systems Co., *Joslyn Technical Data,* AC Surge Protector Surgitron® I, Model 1455–40 (Nov. 1992).
Joslyn Electronic Systems Co., *Joslyn Technical Data,* AC Surge Protector Surgitron® I, Model 1455–80 (Nov. 1992).
Joslyn Electronic Systems Co., *Joslyn Technical Data,* AC Surge Protector, 1455–88 (Aug. 1992).
Joslyn Electronic Systems Co., *Joslyn Technical Data,* AC Surge Protectors Surgitron® III, Model 1456–11 (Jun. 1992).
Joslyn Electronic Systems Co., *Joslyn Technical Data,* AC Surge Protector Surgitron® I, Model 1456–40 (Jul. 1992).
Joslyn Electronic Systems, *Arrester Module Assembly,* Drawing No. 71939 (1980).

FIG. 5
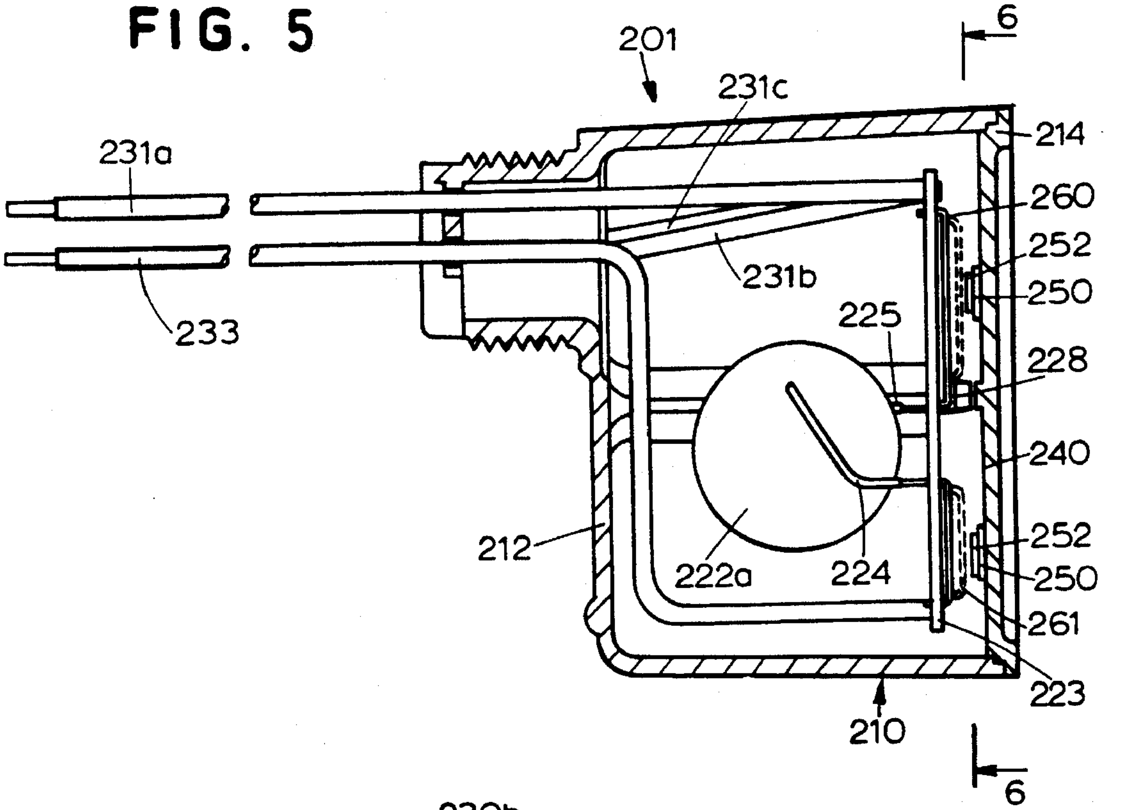
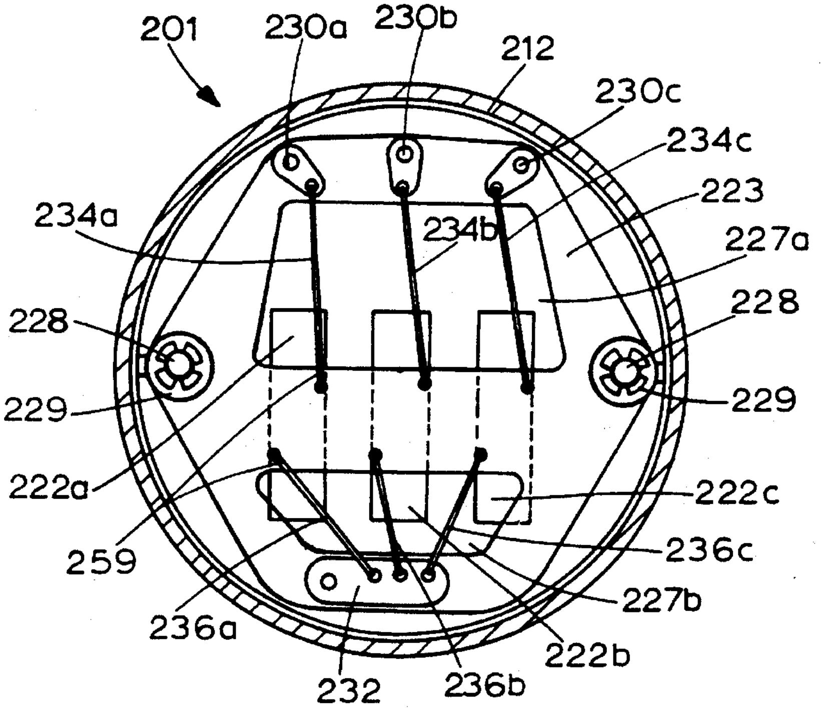
FIG. 6

FIG. 9
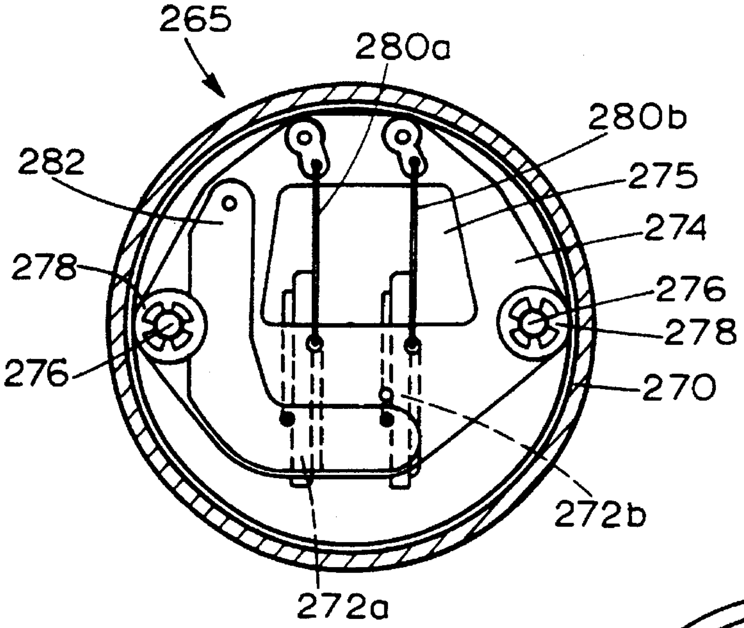
FIG. 11
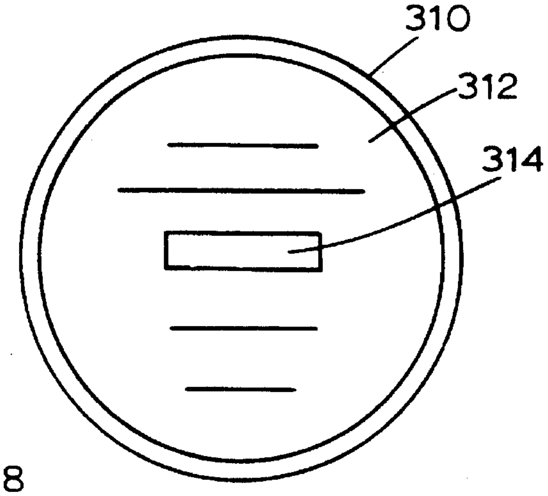
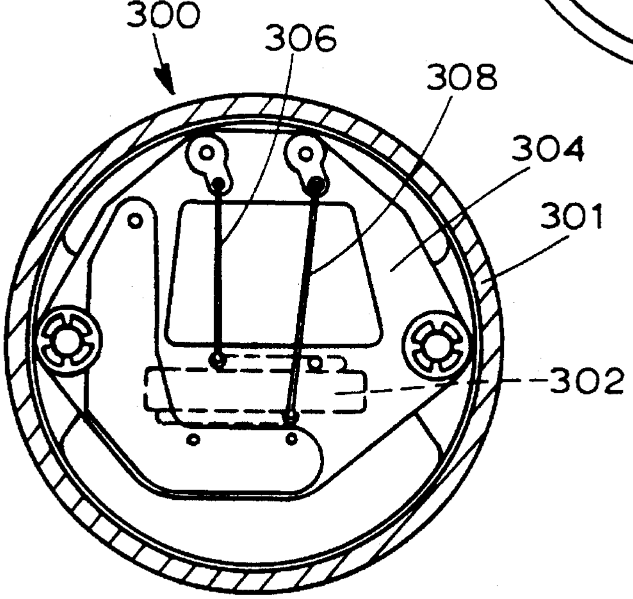
FIG. 10

SECONDARY SURGE ARRESTER WITH ISOLATING AND INDICATING FEATURES

RELATED PATENT APPLICATION

This is a continuation-in-part of U.S. patent application, U.S. Ser. No. 07/911,669, to Osterhout, et el., filed Jul. 8, 1992, and entitled "Secondary Surge Arrester with Isolating and Indicating Features", now abandoned.

TECHNICAL FIELD

The present invention relates generally to secondary surge attesters used in electrical power distribution systems and, more particularly, to gapless, non-fragmenting, ventless secondary surge arresters having failure indicating features.

BACKGROUND ART

Surge arresters are typically connected between the line and ground conductors of an electrical power system and are used to protect electrical equipment connected to those conductors from overvoltage surges appearing thereon. Such surges may be caused, for example, by lightning or by switching.

Surge arresters fall within one of three general categories depending upon their size and/or usage. Station class surge erresters are used in electrical substations to protect electrical equipment connected to power lines having a voltage of, for example, 100,000 volts (100 kV) or more. Distribution class surge arresters, typically placed on the poles supporting overhead power lines, are used to protect the primary side of transformers which step down the voltage on the overhead lines to levels usable in residential or commercial buildings. Thus, distribution class surge arresters protect equipment connected to power lines carrying intermediate voltages which fall in the range of from about 1000 volts up to about 50 kV. Secondary surge arresters are used to protect electrical equipment connected to power lines carrying voltages 1000 volts and below. Such secondary surge arresters are typically applied anywhere from the secondary terminals of the distribution transformer to the service entrance panel within commercial and residential buildings.

Surge arresters, having one or more non-linear voltage dependent resistive elements, such as metal oxide varistor (MOV) arrester elements, are generally referred to as gapless surge arresters. In normal steady-state operation, an MOV arrester element has a high resistance while drawing only minimal current such that the surge arrester acts essentially as an open circuit in the system. However, when an overvoltage surge occurs on the electrical lines protected by the surge arrester, the resistance of the MOV arrester element lowers to allow the surge arrester to act essentially as a short circuit. Accordingly, the surge arrester passes the surge current to ground before the coincident voltage has a chance to damage equipment connected to the protected electrical lines.

The current drawn by gapless surge arresters, even the small current drawn during steady state operation, produces $I^2R$ losses in the form of heat. The casing of the surge arrester must be able to dissipate this heat to the surrounding environment. If the heat from $I^2R$ losses exceeds the ability of the casing to dissipate it, thermal runaway of the gapless surge arrester can occur. Thermal runaway results in destruction of the MOV arrester element and, thus, arcing. Because an arc burns at an extremely high temperature, e.g. 6000–7000 degrees Kelvin, everything within the path of the arc is vaporized. As a result, gas pressure within the surge arrester casing builds up. If the gas pressure is not limited, the casing of the surge arrester will fragment violently presenting a safety risk to adjacent equipment and/or persons in the vicinity.

The ability of the casing to dissipate the heat from $I^2R$ losses is affected by the ambient temperature; that is, as the ambient temperature increases, either the casing is able to dissipate less heat or, conversely, the MOV arrester elements will run hotter to produce a temperature differential which is sufficient to dissipate the heat. The gapless surge arrester must be designed for the highest expected ambient temperature so that the casing can adequately dissipate the heat resulting from such $I^2R$ losses.

Arcing within a gapless surge arrester can also result from other causes. For example, a breakdown of the MOV arrester element insulation coating or a thermal shock to an MOV arrester element caused, for example, by an abnormally high current spike due to a nearby lightning strike, can produce holes or gaps in the MOV arrester element, resulting in its failure. Current then arcs through these holes or gaps leading to vaporization of the failed MOV arrester element and gas pressure buildup as previously described. The resulting violent fragmentation of the arrester casing can injure anyone in the vicinity of the surge arrester. This safety risk increases if these holes or gaps appear in the MOV arrester element immediately before an external fuse is blown or a circuit breaker opens. In this situation, arcing may occur when the user reestablishes the circuit to the surge arrester by closing the circuit breaker or changing the fuse, at which time arcing and the buildup of gas pressure within the surge arrester casing will occur while the user is still in the vicinity of the surge arrester.

To reduce this safety risk, surge arresters have been designed to limit gas pressure buildup by venting such pressure through a rupturable diaphragm, a releasable end cap, or other vent before the arrester explodes. These designs sometimes have an isolating feature, for example, a ground lead disconnector which isolates the surge arrester from the system by mechanically disrupting an electrical connection. Such designs are disclosed in Schmalz, et al., U.S. Pat. No. 3,803,524 and Talbot, et al., U.S. Pat. No. 4,649,457. These designs do not, however, extinguish the arc during a failure of the surge arrester, and thus also present a significant safety risk in that hot pressurized gas is released outside of the surge protector casing making such surge arresters particularly dangerous for use as secondary surge arresters.

Woodworth, et al., U.S. Pat. No. 4,930,039, discloses a station class surge arrester having a vented lining surrounding varistor elements connected in series. Upon failure, internal arcing vaporizes the varistor elements producing ionized gas which escapes through the vented lining. The arc follows the escaping gas outside of the lining thereby preventing further disintegration of the varistor elements and further buildup of gas pressure within the lining such that the outer casing of the surge arrester does not fragment violently. An isolation fuse element may be included in series with the varistor elements in order to eliminate the need for a ground lead disconnector. An isolation fuse, particularly at the voltage levels experienced by station class surge arresters and by distribution class surge arresters, does not of itself extinguish arcing.

Sweetana, Jr., et al., U.S. Pat. No. 4,223,366, discloses a station class gapless surge arrester having a stack of zinc oxide disks disposed within a porcelain casing. A space between the outside of the disks and the inner wall of the porcelain casing is filled with sand or other thermally conductive media in order to reduce the thermal resistance between the zinc oxide disks and the casing so as to more efficiently transfer heat from the zinc oxide disks to the porcelain casing during normal operation. This configuration allows the surge arrester to operate in higher ambient temperatures or at higher steady-state voltages before entering a thermal runaway condition. The sand changes state to absorb a limited amount of fault energy in the event of a failure of the zinc oxide disks. The sand, however, is insufficient to extinguish arcing within the surge arrester structure and, therefore, does not prevent explosive fragmentation of the surge arrester.

Another known prior art surge arrester has a stack of donut shaped MOVs enclosed in an outer cylindrical casing. Rupturable diaphragms cover the casing ends. Sand fills a gap between the outside of the MOVs and the inside of the casing while air fills the inner circular space of the donut shaped MOVs. In the event of a failure of one of the MOVs, any arcing, which prefers the air filled space to the sand filled space, is directed through the inner circular space of the donut shaped MOVs. Thus, the arc is prevented from thermally shocking the outer casing and causing it to rupture. Gas produced by the arc, however, increases the pressure within the casing which forces the diaphragms to expand and rupture thereby releasing hot gas outside of the casing.

It is further known that a current limiting fuse can be externally placed in series with a surge arrester to protect against violent failures of the surge arrester. This arrangement, however, substantially increases the cost of the surge arrester in that current limiting fuses can cost as much, if not more, than standard surge arresters available in the marketplace. Also, such a configuration is difficult to implement in normal residential and commercial buildings where space is limited. Still further, failure of such a surge arrester configuration is not easily detectable because this surge arrester configuration does not fragment, rupture a diaphragm or provide any other visual physical sign indicating the failure thereof.

Another known surge arrester includes a plurality of MOVs which are mounted in parallel on a circuit board and which are sealed within a casing filled with sand. Each of the MOVs is connected in series with a fuse wire between a line terminal and a neutral or ground terminal which terminals are coupled to electrical lines of an electrical power system. The parallel-connected MOVs operate as a short circuit between the line and ground terminals when an overvoltage surge appears on the electrical lines. Furthermore, the fuse wires and the sand operate as current limiting fuses during a failure of any of the MOVs to prevent buildup of gases within the casing and subsequent fragmentation thereof.

This surge arrester also includes either neon lights or light emitting diodes (LEDs) which, along with diodes and dropping resistors, are coupled across the line and the ground terminals to indicate a failure of one or more of the MOVs. This indicating feature, however, substantially increases the cost of the surge arrester due to the extra circuitry and manufacturing steps required therefor. Furthermore, both the LEDs and the neon bulbs violate the integrity of the casing seal which may cause leaks within the casing and lead to premature failure of one or more of the MOVs. Still further, the casing of this surge arrester must be made larger than would be otherwise necessary in order to dissipate the additional heat generated by the $I^2R$ losses within the neon lights, the LEDs and the dropping resistors. Moreover, because a lighted neon bulb or an emitting LED indicates proper operation of this surge arrester, a burned out bulb or a failed LED falsely indicates failure of this surge arrester which results in the premature replacement thereof.

SUMMARY OF THE INVENTION

The disadvantages of these prior art surge arresters are substantially avoided by the present invention. In accordance with one aspect of the present invention, a secondary surge arrester comprises a casing and first and second electrical conductors which extend through the casing. A surge current passing means is located within the casing for passing surge currents from one of the electrical conductors to the other of the electrical conductors. An indicating means is also located within the casing and is responsive to heat generated during a failure of the surge current passing means for indicating a failure of the surge current passing means.

In accordance with further aspects of the invention, the secondary surge arrester may include arc current extinguishing means in the form of a fusible material surrounded by electrically nonconductive, thermally conductive particulate material, such as sand. In the event of a failure of the surge current passing means, the fusible material opens, and the fusible material together with the electrically nonconductive, thermally conductive particulate material extinguishes the arc current. The electrically nonconductive, thermally conductive particulate material may be a material which changes states in order to promote the extinguishing of the arc current. The surge current passing means may be a voltage dependent resistive element, such as a metal oxide varistor. The indicating means may include a heat sensitive material disposed between the particulate material and a transparent area of the casing, wherein the heat sensitive material is responsive to the heat generated by the arc current. Still further, the fusible material may be biased to open at a particular location, preferably near the indicating means.

According to another aspect of the invention, a secondary surge arrester comprises first and second electrical conductors, a fault current limiting fuse, an arrester element, a ventless casing, and a heat sensitive element. The fault current limiting fuse and the arrester element are connected to the first and second electrical conductors such that the arrester element conducts surge currents from one of the first and second electrical conductors to the other of the first and second electrical conductors in response to electrical surges. The ventless casing encloses the arrester element and the fault current limiting fuse. The heat sensitive element is disposed near the fault current limiting fuse and responds to heat generated by the fault current limiting fuse during a failure of the arrester element to indicate the operability of the arrester element.

According to yet another aspect of the invention, a method of assembling a secondary surge arrestor comprises the steps of (a) matching a voltage dependent resistive element with a fault current limiting fuse such that the voltage dependent resistive element passes surge currents and the fault current limiting fuse extinguishes arc currents occurring as a result of a failure of the voltage dependent resistive element, (b) connecting the voltage dependent resistive element and the fault current limiting fuse in series between the first and second electrical conductors, and (c) enclosing the voltage dependent resistive element, the fault current limiting fuse and a heat sensitive material within a casing so that the heat sensitive material responds to heat generated by the fault current limiting fuse during failure of the voltage dependent resistive element in order to indicate the failure of the voltage dependent resistive element.

BRIEF DESCRIPTION OF THE DRAWING

These and other features and advantages will become more apparent from a detailed consideration of the invention when taken in conjunction with the drawing in which:

FIG. 5 is a cross-sectional side view of a second embodiment of a three-phase secondary surge arrester according to the present invention;

FIG. 6 is a cross-sectional top view of the secondary surge arrester shown in FIG. 5;

FIG. 9 is a cross-sectional top view of a second embodiment of a two-phase secondary surge arrester according to the present invention;

FIG. 10 is a cross-sectional top view of an embodiment of a single-phase secondary surge arrester according to the present invention; and FIG. 11 is a top view of the cover of the secondary surge arresters shown in FIGS. 8 and 9.

DESCRIPTION OF THE PREFERRED EMBODIMENTS

Figure 1:
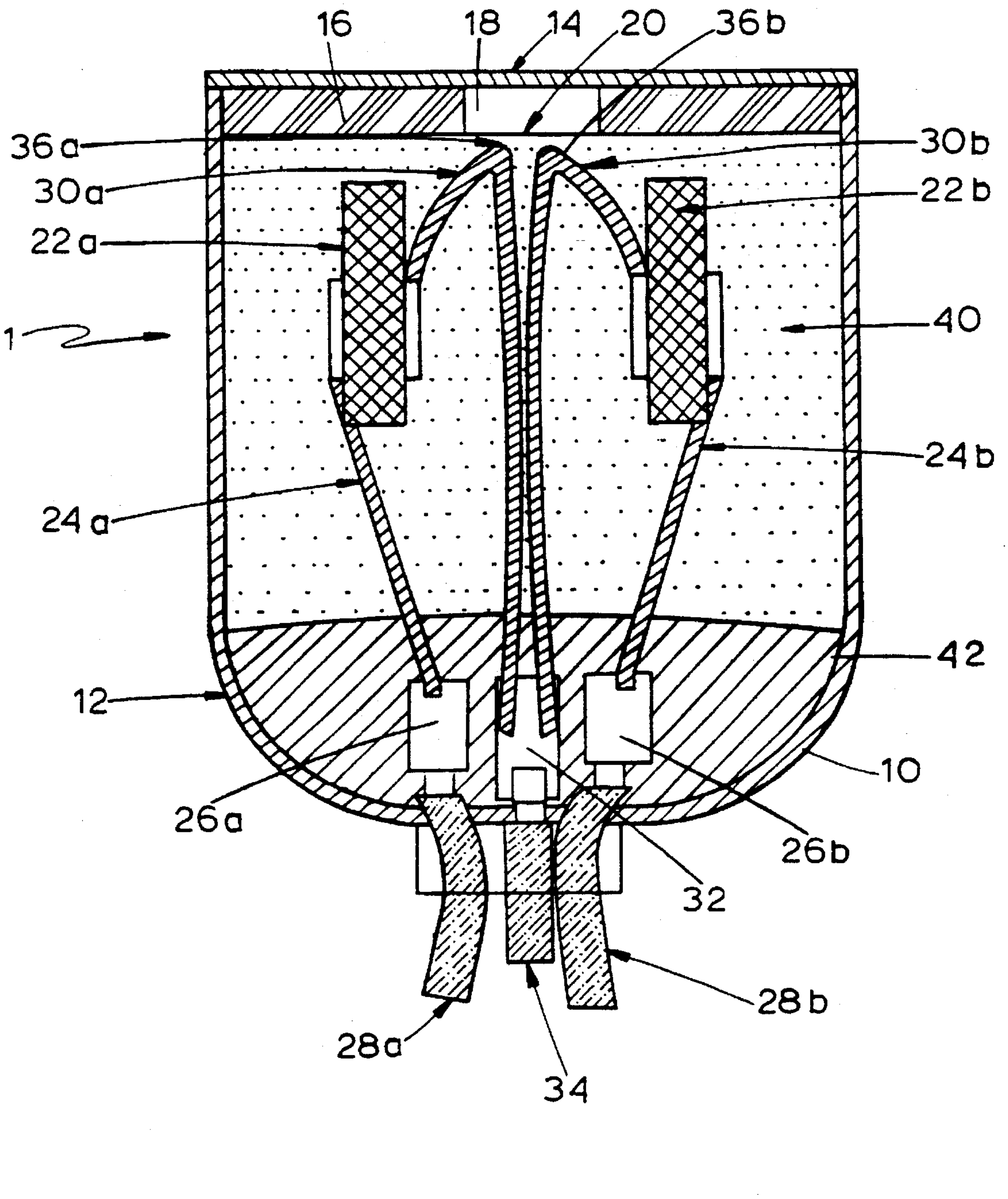
FIG. 1 is a cross-sectional side view of a two-phase embodiment of the secondary surge arrester according to the present invention.

Shown in FIG. 1 is a two-phase embodiment of the inventive secondary surge arrester 1. An outer casing 10 of the secondary surge arrester 1 includes a housing 12, which may be formed of a plastic material such as noryl, and a cover 14, which is attached by ultrasonically welding or by bonding to the housing 12 and which may be formed of a transparent material such as lucite. Within the casing 10 is a gasket or spacer 16 having an opening 18. As viewed in FIG. 1, the gasket 16 lies directly under the cover 14, and a barrier material 20, for example paper, lies directly under the gasket 16. In this manner, a portion of the barrier material 20 is visible through the cover 14 and the opening 18. The barrier material 20 in conjunction with the gasket 16 and the cover 14 operate as an indicating means.

Arrester elements in the form of voltage dependent resistive elements such as metal oxide varistor (MOV) arrester elements 22*a* and 22*b* are disposed within the casing 10. Two MOV arrester elements are shown because the electrical service provided to most residential and commercial structures includes two phases. However, it should be appreciated that the secondary surge arrester according to the present invention can contain any number of arrester elements to protect any number of phases. Leads 24*a* and 24*b* are bonded to one side of the MOV arrester elements 22*a* and 22*b*, respectively, and are also coupled through crimp connectors 26*a* and 26*b* to conductors 28*a* and 28*b*, respectively. Conductors 28*a* and 28*b* extend through the housing 12 for connection to the lines supplying power to the protected equipment (not shown). Leads 30*a* and 30*b* are connected to the other side of the MOV arrester elements 22*a* and 22*b*, respectively, and are also coupled through a common crimp, solder or weld connector 32 to a ground conductor 34. The ground conductor 34 extends through the housing 12 for connection with a ground line (not shown). A fusible material, such as #22 copper wire, may be used for each of the leads 24*a* and 24*b* or for each of the leads 30*a* and 30*b*. Preferably, however, such a fusible material is used for all of the leads 24*a*, 24*b*, 30*a*, and 30*b*.

Some or all of the fusible leads 24*a*, 24*b*, 30*a*, and 30*b* may be physically stressed. For example, fusible leads 30*a* and 30*b* are stressed at respective locations 36*a* and 36*b* in close proximity to the portion of the barrier material 20 visible through the opening 18 and the cover 14. This stressing can take the form of crimping or any other process which causes the stressed fusible leads to first open near the opening 18 when current flowing through the secondary surge arrester 1 reaches a level indicating a failure of the MOV arrester elements 22*a* and/or 22*b*.

A substantially electrically nonconductive, substantially thermally conductive particulate material 40, such as sand, boric acid, or a combination thereof, fills a portion of the casing 10 adjacent the barrier material 20, and substantially surrounds the MOV arrester elements 22*a*, 22*b* and the fusible leads 24*a*, 24*b*, 30*a*, and 30*b*. The sand 40 may preferably be silica, although other types of sand, which are good thermal conductors but poor electrical conductors, may be used. A potting material 42 is disposed between the sand 40 and the housing 12 to substantially surround the crimp connectors 26*a*, 26*b*, and 32 and to seal the casing 10 so that it is ventless. Sand is a good thermal conductor and a good electrical insulator (i.e. nonconductor). Accordingly, the sand 40 transmits the heat produced by the $I^2R$ losses of the MOV arrester elements 22*a* and 22*b* to the housing 12 where the heat is dissipated, and at the same time prevents electrical shorting between the leads 24*a*, 24*b*, 30*a*, and 30*b* and between these leads and the casing 10.

In operation, in the steady state, the secondary surge arrester 1 does not conduct a significant amount of current and normal system current passes to the equipment protected by the secondary surge arrester 1. However, upon the occurrence of an overvoltage surge, the unusually large voltage associated therewith causes the resistance of the MOV arrester elements 22*a* and/or 22*b* to drop dramatically. The secondary surge arrester 1 then acts as a short circuit and passes surge current from the leads 28*a*, 28*b*, through the fusible leads 24*a*, 24*b*, through the MOV arrester elements 22*a*, 22*b*, through the fusible leads 30*a*, 30*b*, and then to the ground conductor 34. The fusible leads 24*a*, 24*b*, 30*a*, and 30*b* do not melt in the presence of such surge currents. This process prevents damage to the electrical equipment protected by the secondary surge arrester 1 by shunting surge currents through the secondary surge arrester 1, thus preventing overvoltages which could damage the protected equipment.

In the event that one of the MOV arrester elements 22*a*, 22*b* fails, an arc may develop. For example, if the MOV arrester element 22*a* fails, and if a resulting arc develops and is not extinguished, this arc may vaporize a portion of the failed MOV arrester element 22*a* and cause a buildup of gas pressure within the surge arrester casing 10. The resultant fault current flowing through the leads 24*a* and 30*a* may be extremely large, and is sufficient to melt the fusible lead 30*a*, at least at the stressed point 36*a*. When the fusible lead 30*a* opens, arcing occurs through the sand 40 because of the voltage differential existing between the lead 24*a* and the lead 30*a*. As a result of the arc, the sand 40 transforms into glass and cinders, thereby absorbing heat. Also, since glass is a good electrical insulator, the transformed sand limits the fault current, thereby depriving the arc of the electrons necessary to sustain it. Accordingly, the arc is extinguished and the fault current ceases. This process prevents the further vaporization of components within the secondary surge arrester 1 which, in turn, limits gas pressure to thereby prevent the violent fragmentation of the casing 10.

The fusible leads 24*a* and/or 30*a* and the surrounding sand 40 operate as a fault current limiting fuse for the MOV arrester element 22*a*; this fault current limiting fuse serves to limit current flowing through the secondary surge arrester 1 during failure of the MOV arrester element 22*a*. Similarly, the fusible leads 24*b* and/or 30*b* and the surrounding sand 40 operate as a fault current limiting fuse for the MOV arrester element 22*b*. This fault current limiting fuse serves to limit current flowing through the secondary surge arrester 1 during failure of the MOV arrester element 22*b*.

In order to extinguish the arc current through the secondary surge arrester, it is necessary that the fault current limiting fuse create a back voltage of opposite polarity and of at least equal magnitude to the voltage across the electrical lines to which the secondary surge arrester is connected. With such a back voltage, the resulting voltage drop across the secondary surge arrester is zero and current cannot flow therethrough. Therefore, the fault current limiting fuse must be designed to create this back voltage.

For example, an arc current through sand can produce a voltage on the order of 300 v/inch there-across. Since a secondary surge arrester can be used in electrical systems carrying up to 1000 volts, it is necessary that the path length through which the arc current flows be in excess of three inches, preferably on the order of 3.5 inches. Thus, an arc current flowing through 3.5 inches of sand produces a voltage of about 300 v/inch times 3.5 inches, or 1050 v. Since this back voltage is greater than the voltage across the electrical lines to which the secondary surge arrester is connected and is of opposite polarity, the arc current cannot be supported and the arc will be extinguished.

Therefore, in the secondary surge arrester 1, if only the lead 24*a* is fusible, it must be on the order of 3.5 inches in length. If only the lead 30*a* is fusible, then it must be on the order of 3.5 inches in length. If both of the leads 24*a* and 30*a* are fusible, then the total length of these two leads must be on the order of 3.5 inches in length. These dimensions similarly apply to the fault current limiting fuse comprised of the leads 24*b* and 30*b* and the sand 40.

The MOV arrester elements 22*a* and 22*b* and the fault current limiting fuses associated therewith must be matched. If the MOV arrester elements 22*a* and 22*b* are selected to operate in a normal 1000 volts environment, the fault current limiting fuses must be able to produce a back voltage of at least 1000 volts. Furthermore, the fault current limiting fuse must not melt in the presence of normal surge currents passed by the arrester elements but must melt in the presence of fault currents.

The failure of the MOV arrester element 22*a* and subsequent change of state by the sand 40 at the stressed location 36*a* may cause a color change or rupture in the barrier material 20 at a location visible through the opening 18 and the cover 14. This color change or rupture indicates that the secondary surge arrester 1 needs to be replaced. It should be noted that the barrier material 20 can be made of either paper which burns or blackens in response to the heat generated by the arc current through the sand 40, or any other material which alters state in response to a failure of the MOV arrester elements 22*a* and 22*b*. This indicating function can also be accomplished without stressing the fusible leads 30*a* and 30*b* at locations 36*a* and 36*b* by merely placing the fusible leads 24*a*, 24*b* and/or 30*a*, 30*b* generally within close proximity to the barrier material 20.

Figure 2:
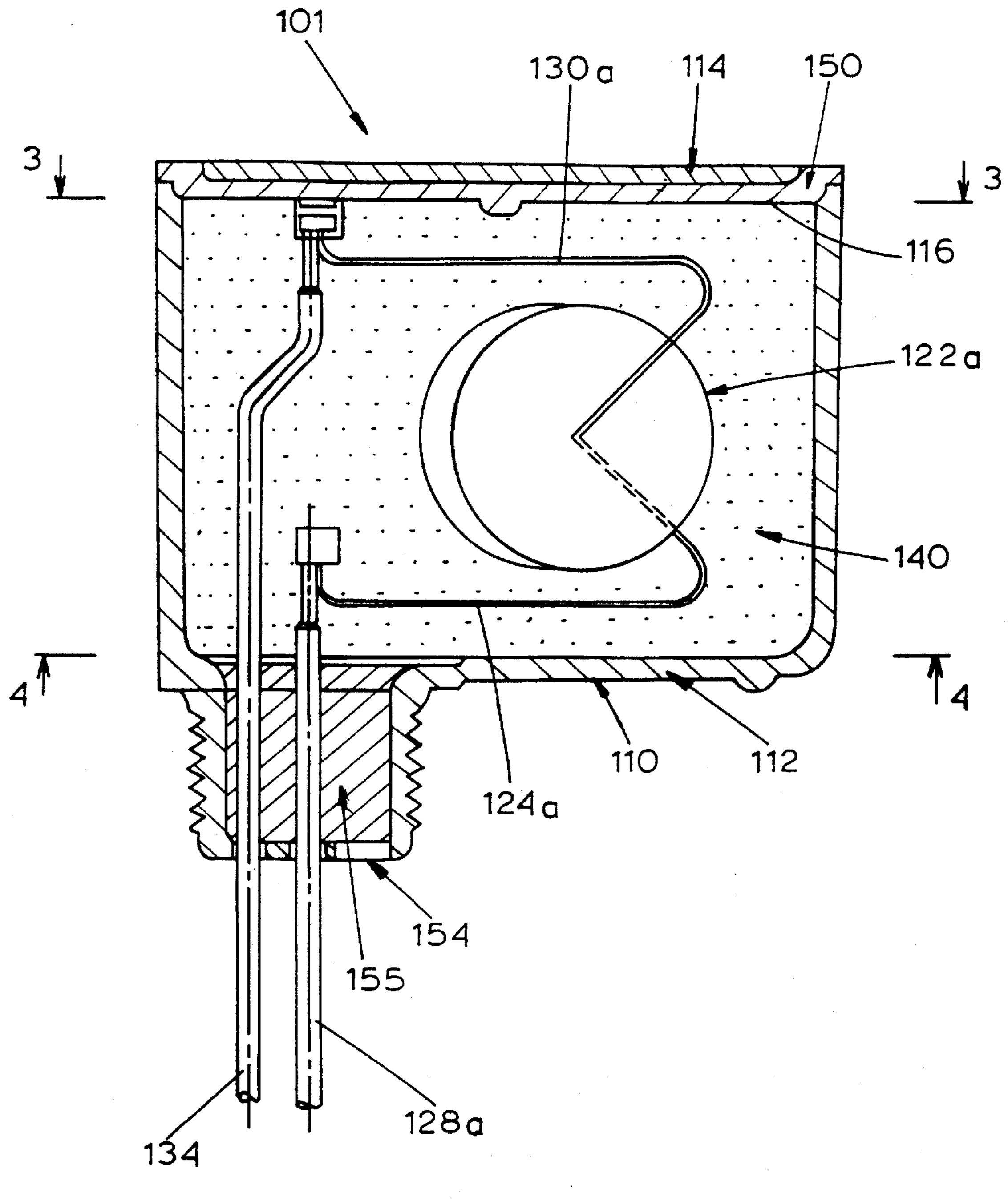
FIG. 2 is a cross-sectional side view of a first embodiment of a three-phase secondary surge arrester according to the present invention.
Figure 3:
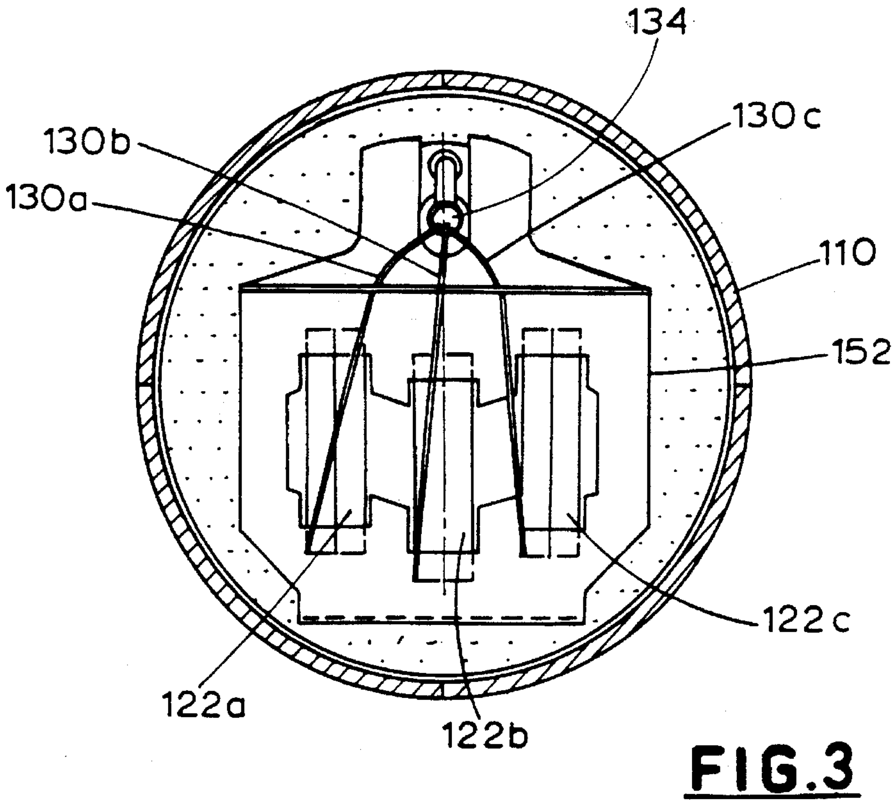
FIG. 3 shows a cross-sectional top view of the secondary surge arrester shown in FIG. 2.
Figure 4:
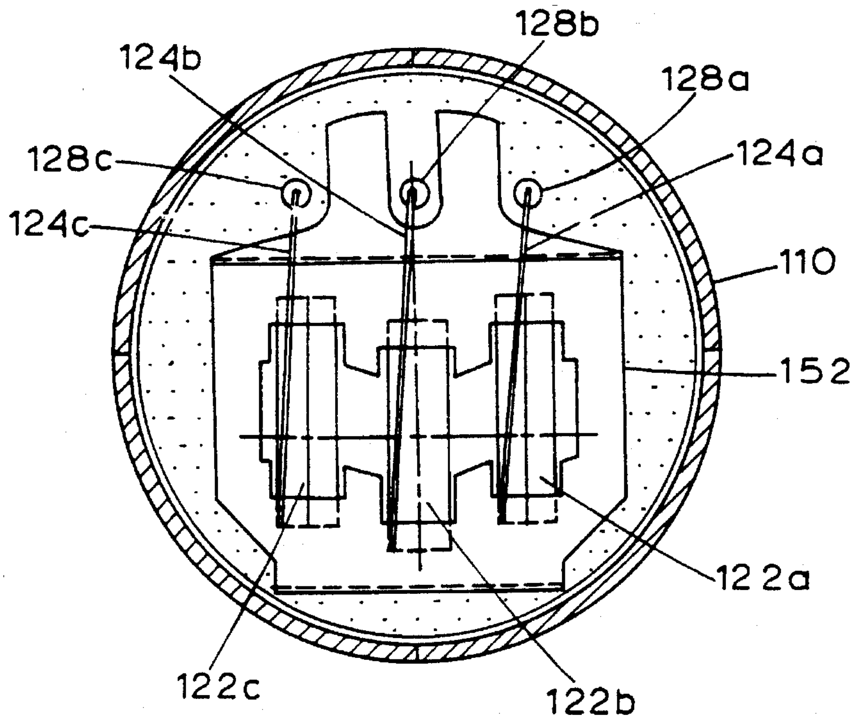
FIG. 4 shows a cross-sectional bottom view of the secondary surge arrester shown in FIG. 2.

Shown in FIGS. 2, 3 and 4 is a three-phase secondary surge arrester 101 according to the present invention. For clarity, FIG. 2 shows only one MOV arrester element for one of the three phases, it being understood that, as shown in FIGS. 3 and 4, there are actually at least one such MOV arrester element for each phase. As shown in FIGS. 2, 3, and 4, an outer casing 110 includes a housing 112, an end cap 150 ultrasonically welded or otherwise bonded to the housing 112, and a transparent cover 114 secured to the end cap 150 as by ultrasonically welding, bonding and/or press fitting. At least a portion of the end cap 150 is transparent. MOV arrester elements 122*a*, 122*b* and 122*c* are disposed within the casing 110 (with only the MOV arrester element 122*a* shown in FIG. 2). As shown in FIG. 2, one side of the MOV arrester element 122*a* is connected by a lead 124*a* to a line conductor 128*a* and the other side of the arrester element 122*a* is connected by a lead 130*a* to a ground conductor 134. The line conductor 128*a* and the ground conductor 134 extend through the casing 110 and are connected to the power lines connected to the electrical equipment protected by the secondary surge arrester 101.

FIGS. 3 and 4 show the additional arrester elements 122*b* and 122*c* contained in the casing 110 and the ground and line conductor connections thereto. Specifically, as shown in FIG. 3, which is a top view of the secondary surge arrester 101 shown in FIG. 2 taken along line 3—3, the ground conductor 134 extends into the casing 110. Leads 130*a*, 130*b* and 130*c* are connected between the ground conductor 134 and one side of the MOV arrester elements 122*a*, 122*b* and 122*c*, respectively. As shown in FIG. 4, which is a bottom view of the secondary surge arrester 101 shown in FIG. 2 taken along line 4—4, the line conductors 128*a*, 128*b* and 128*c* extend into the casing 110 and are connected to the opposite sides of the MOV arrester elements 122*a*, 122*b* and 122*c* by the leads 124*a*, 124*b* and 124*c*.

Sand 140 fills the casing 110 and substantially surrounds the MOV arrester elements 122*a*, 122*b*, 122*c*, and the leads 124*a*, 124*b*, 124*c*, 130*a*, 130*b* and 130*c*. The fusible leads 130*a*, 130*b*, 130*c* run parallel to the transparent cover 112 and are in close proximity thereto. In this configuration, when any of the fusible leads 130*a*, 130*b*, and 130*c* melts, the sand 140 transforms into glass at a point visible through the transparent cover 114, thereby indicating the failure of any or all of the MOV arrester elements 122*a*, 122*b*, and/or 122*c*. A heat sensitive material, such as paper, may be provided between the sand 140 and the transparent cover 114 to change color in response to the heat generated by an arc current to thereby enhance the indication that an MOV arrester element has failed.

The fusible leads 124*a* and/or 130*a* and the sand 140 form a fault current limiting fuse for the MOV arrester element 122*a*; the fusible leads 124*b* and/or 130*b* and the sand 140 form a fault current limiting fuse for the MOV arrester element 122*b*; and, the fusible leads 124*c* and/or 130*c* and the sand 140 form a fault current limiting fuse for the MOV arrester element 122*c*. These fault current limiting fuses operate in the same fashion as the fault current limiting fuses in the secondary surge arrester 1 shown in FIG. 1.

During assembly of the secondary surge arrester 101, a harness board 152, shown in FIGS. 3 and 4, is used to hold the leads 124*a*, 124*b*, 124*c*, 130*a*, 130*b*, 130*c* and the MOV arrester elements 122a, 122b, 122c in place while the casing 110 is filled with sand. Otherwise, the fragile leads 124a, 124b, 124c, 130a, 130b, and 130c could not support the weight of the MOV arrester elements 122a, 122b, and 122c. This harness board 152 can be made of flexible yet strong material such as paper or netting. It is also possible to hold the leads 124a, 124b, 124c, 130a, 130b, 130c and the MOV arrester elements 122a, 122b, and 122c in place with internal tabs provided on the casing 110 during insertion of the sand 140. The sand is introduced into the casing 110 through an extension 154 of the housing 112 and, after filling, the extension 154 is sealed as by a potting material 155. The sealed extension 154 completes the casing 110 which, at this point, has no vents. The sand 140 provides further support for the leads 124a, 124b, 124c, 130a, 130b, and 130c and for the MOV arrester elements 122a, 122b, and 122c.

A second embodiment of a three-phase secondary surge arrester 201 according to the present invention is illustrated in FIGS. 5–8. Referring now to FIG. 5, an outer casing 210 includes a housing 212 and a transparent cover 214 which is secured to the housing 212 by, for example, ultrasonic welding, bonding and/or press fitting. As clearly illustrated in FIG. 6, which is a top view of the secondary surge arrester 201 taken along section lines 6—6 of FIG. 5, MOVs 222a, 222b, and 222c are disposed within the casing 210 and are attached to a circuit board 223 via leads 224 and 225 (shown in FIG. 5). The circuit board 223, which may be made of, for example, plastic, has two trapezoidal-shaped holes 227a and 227b therethrough and is attached to the housing 212 via posts 228 and push nuts 229 so that the circuit board 223 is parallel to and in close proximity to the cover 214.

Line terminals 230a, 230b, 230c, which are connected to line conductors 231a, 231b and 231c (shown in FIG. 5), respectively, and a ground plate 232, which is connected to a ground conductor 233 (shown in FIG. 5), are disposed on the circuit board 223. The line terminals 230a, 230b, 230c are electrically connected to a first side of each of the MOVs 222a, 222b, 222c via fuse wires 234a, 234b, and 234c, respectively, while the ground plate 232 is electrically connected to a second side of each of the MOVs 222a, 222b, 222c via fuse wires 236a, 236b, and 236c, respectively. The fuse wires 234a, 234b, 234c, 236a, 236b, 236c are constructed according to the principles described hereinbefore with respect to the leads 24a, 24b, 30a and 30b of the embodiment shown in FIG. 1. Furthermore, the fuse wires 234a, 234b, 234c, 236a, 236b, and 236c are located over the trapezoidal-shaped holes 227a and 227b within the circuit board 223 and lie substantially parallel to and in close proximity to the cover 214. Similar to the embodiments illustrated in FIGS. 1 and 2, the casing 210 is filled with sand, boric acid or a combination thereof, so that the MOVs 222a, 222b, 222c, the circuit board 223, and the fuse wires 234a, 234b, 234c, 236a, 236b, 236c are surrounded by the sand and/or boric acid.

Figure 7:
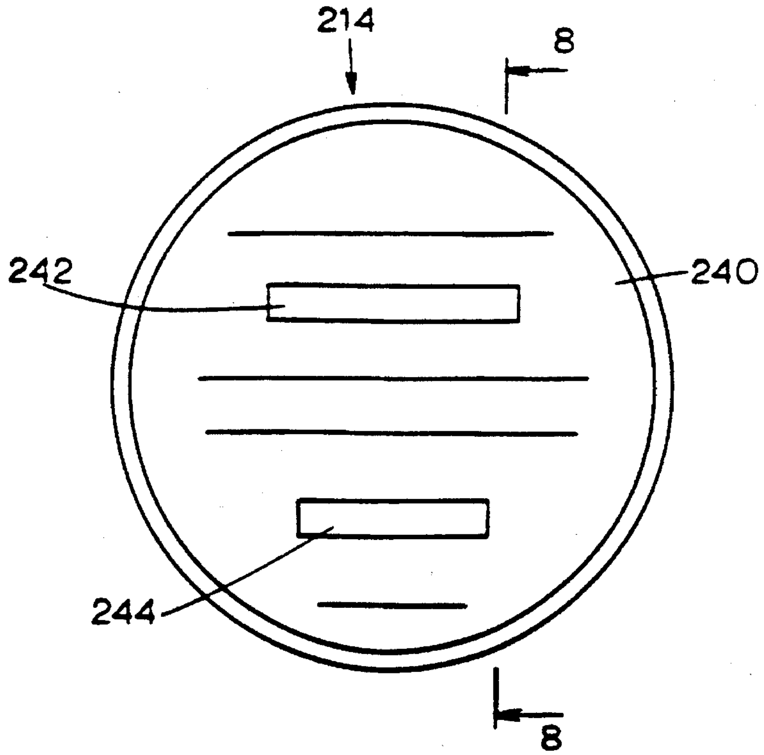
FIG. 7 is a top view of the cover of the secondary surge arrester shown in FIG. 5.
Figure 8:
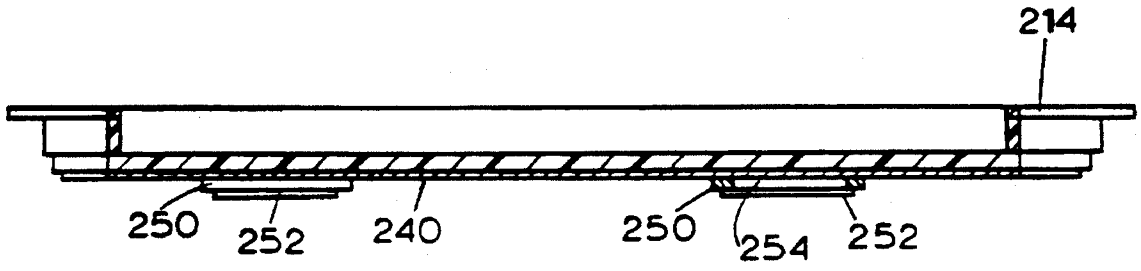
FIG. 8 is a cross-sectional side view of the cover shown in FIG. 7.

As shown in FIGS. 7 and 8, the cover 214 includes a label 240 on a bottom surface thereof. The label 240 includes two transparent rectangular areas 242 and 244 and may include printing thereon to indicate the manufacturer of the surge arrester, the type or power rating of the surge arrester, instructions for detecting whether the surge arrester has failed, and/or any other desired information. As illustrated in FIG. 8, which is a cross-sectional view of the cover 214 taken along section lines 8—8 of FIG. 7, two sections of a barrier material 250 are disposed between the label 240 on the lower surface of the cover 214 and a heat sensitive material 252. Each of the sections of the barrier material 250 includes a rectangular hole 254 therethrough which is aligned with a corresponding one of the transparent areas 242 or 244 of the label 240 so that the heat sensitive material 252 is viewable through the transparent cover 214 and the transparent areas 242 or 244 of the label 240. Alternatively, the cover 214 may include a recessed portion which accepts the barrier material 250 and heat sensitive material 252 therein.

The heat sensitive material 252 may comprise any heat sensitive material which burns, changes color, becomes transparent to expose different materials, including printed materials, or otherwise changes form or shape when the sand adjacent the heat sensitive material 252 reaches a predetermined temperature. Preferably, the heat sensitive material 252 comprises a material identified with the trademark "Temp-plate," which material is produced by Wahl Instruments, Inc., and which has a black layer and a white layer disposed adjacent one another. When this "Temp-plate" material is exposed to heat exceeding its calibrated temperature the white layer becomes irreversibly transparent allowing the black layer underneath to be exposed. When used with the surge arrester 201, this "Temp-plate" material should be mounted on the barrier material 250 with, for example, tape, glue or any other desired bonding material, so that the white layer is closer to the cover 214 than the black layer. In such a configuration, when viewed through the cover 214, the "Temp-plate" material turns black when it reaches a predefined temperature, preferably 65 degrees celsius, and thereby indicates failure of the surge arrester 201. It should be noted that the "Temp-plate" material is considered advantageous because it has a long shelf life, is very stable, and is not affected by ultraviolet (UV) radiation. The "Temp-plate" material is, however, susceptible to moisture and, therefore, must be completely sealed within the casing 210.

Alternatively, the heat sensitive material 252 may comprise a polycarbonate material such as the material identified with the trademark "Lexan," which material is produced by General Electric Corp. and which exhibits photostress characteristics when exposed to predefined amounts of heat. These photostress characteristics can be observed by radiating the "Lexan" material with, for example, an ultraviolet light source and viewing the "Lexan" material through a polarized lens. Still further, the heat sensitive material 252 can comprise heat sensitive facsimile paper. Facsimile paper is considered disadvantageous, however, because it has a short shelf life. Furthermore, the use of facsimile paper or any other paper which is triggered by UV radiation is considered disadvantageous when the surge arrester 201 is to be used out-of-doors.

The barrier material 250, which may be, for example, cardboard or any other soft or pliable material and is, preferably, approximately one ten thousandth of an inch thick, isolates the heat sensitive material 252 from vibrations within the cover 214 which may occur, for example, during ultrasonic welding of the cover 214 to the housing 212. The barrier material 250 is particularly important when the "Temp-plate" material is used because, it has been found, that the "Temp-plate" material is sensitive to scratching and to high frequency vibrations and may otherwise change color during ultrasonic welding of the cover 214 to the housing 212. The barrier material 250 may, however, be eliminated when the surge arrester 201 is constructed using a heat sensitive material 252 which is not sensitive to scratching or to vibrations or when the cover 214 is attached to the housing 212 by a method other than ultrasonic welding.

The cover 214 should be oriented on the housing 212 such that the transparent area 242, and heat sensitive material 252 viewable therethrough, are substantially above and in close proximity to the fuse wires 234*a*, 234*b* and 234*c*, and such that the transparent area 244, and the heat sensitive material 252 viewable therethrough, are substantially above and in close proximity to the fuse wires 236*a*, 236*b* and 236*c*. Preferably, the fuse wires 234*a*, 234*b*, 234*c*, 236*a*, 236*b*, 236*c* are located approximately one quarter of an inch away from the heat sensitive material 252 when the cover 214 is attached to the housing 212.

During operation of the surge arrester 201, when any of the fuse wires 234*a*, 234*b*, 234*c*, 236*a*, 236*b*, 236*c* melt in response to a failure of one or more of the MOVs 222*a*, 222*b*, and/or 222*c*, the sand surrounding the melted wire transforms into glass which acts as an insulator to quench any arcs which may result. The sand also prevents further arcing from occurring within the housing 212 so that the fuse wires and sand act as current limiting fuses. Heat generated during this process propagates through the sand surrounding the melted wire causing the heat sensitive material 252 to change color or form in an irreversible manner. The heat sensitive material 252, which is visible through the cover 214 and through one or both of the transparent areas 242 and 244 of the label 240, thereby indicates failure of one or more of the MOVs 222*a*, 222*b*, 222*c*.

It should be noted that upon failure of one of the MOVs, such as MOV 222*a* for example, the melting of the fuse wires 234*a* and/or 236*a* usually begins at locations 259 (shown in FIG. 6) where the fuse wires 234*a* and 236*a* extend through the circuit board 223 and make ninety degree bends. As such, it may be desirable to locate the heat sensitive material 252 directly above the locations 259 in order to ensure that heat generated by the fusing of one of the fuse wires 234*a* or 236*a* causes the heat sensitive material 252 to change color or form.

It should also be noted that the ground side fuse wires 236*a*, 236*b* and 236*c* can be replaced with a single fuse wire connected to a ground-side lead of each of the MOVs 222*a*, 222*b* and 222*c* and to the ground plate 228.

In an alternative embodiment, secondary fuse wires 260 and 261 (indicated in phantom lines in FIG. 5) can be connected in parallel with the fuse wires 234*a* and 236*a*, respectively (it being understood that similar secondary fuse wires can be connected in parallel with the fuse wires 234*b*, 234*c*, 236*b* and 236*c*). The secondary fuse wires 260, 261 which may be, for example, 26 gauge nichrome wire, have a higher resistivity than the fuse wires 234*a*, 236*a*, and are located closer to the heat sensitive material 252 than the fuse wires 234*a*, 236*a*. Alternatively, the secondary fuse wires 260, 261 may be placed in contact with the heat sensitive material 252. During normal operation of the surge arrester 201, substantially all of the current flows through the fuse wires 234*a*, 236*a* which prevents the secondary fuse wires 260, 261 from heating to an appreciable temperature. However, when the MOV 222*a* fails, one or both of the fuse wires 234*a*, 236*a* fuses which forces the associated secondary fuse wires 260 and/or 261 to conduct a large amount of current which, in turn, generates enough heat to burn or otherwise activate the heat sensitive material 252.

A further embodiment of a two-phase surge arrester 265 according to the present invention is shown in FIG. 9. The surge arrester 265 includes a housing 270 which is filled with sand and which includes MOVs 272*a* and 272*b* supported by a circuit board 274 having a single trapezoidal-shaped hole 275 therethrough. The circuit board 274 is connected to the housing 270 via posts 276 and push nuts 278. One side of each of the MOVs 272*a* and 272*b* is connected to a line conductor (not shown) via a fuse wire 280*a* and 280*b*, respectively while the other side of each of the MOVs 270*a*, 270*b* is connected to a ground plate 282 which, in turn, is connected to a ground conductor (not shown).

A single-phase secondary surge arrester 300 according to the present invention is illustrated in FIG. 10. The surge arrester 300 includes a housing 301 filled with sand and a single MOV 302 connected to a circuit board 304. One side of the MOV 302 is connected to a line conductor (not shown) via a fuse wire 306 while the other side of the MOV 302 is connected to a ground conductor (not shown) via a fuse wire 308.

A transparent cover 310 having a label 312 with a rectangular-shaped transparent area 314 therein is shown in FIG. 11. As described with respect to the embodiment illustrated in FIGS. 5–8, a heat sensitive material is located directly beneath the transparent area 314 of the label 312 and is separated therefrom by cardboard spacers. The cover 310 may be used with either of the embodiments shown in FIGS. 9 or 10 and should be oriented so that the transparent area 314 of the label 312 is located directly above the fuse wires 280*a*, 280*b* of the embodiment shown in FIG. 9 or the fuse wires 306 and 308 of the embodiment shown in FIG. 10.

As should be evident to those skilled in the art, the two-phase and single-phase surge arresters illustrated in FIGS. 9 and 10, respectively, perform according to the same principles described with respect to the three-phase surge arrester 201 illustrated in FIGS. 5–8. Furthermore, each of the embodiments of the surge arresters illustrated in FIGS. 5–11 are constructed according to substantially the same method described with respect to the surge arrester 101 shown in FIG. 2–4, except that the circuit boards 223, 274 and 304 are used instead of the harness board 152.

Numerous modifications and alternative embodiments of the invention will be apparent to those skilled in the art in view of the foregoing description. Accordingly, this description is to be construed as illustrative only and the details of the structure may be varied without departing from the spirit of the invention.

We claim:

1. A secondary surge arrester comprising:

a casing having a transparent area;

first and second electrical conductors extending through the casing;

surge current passing means located within the casing and coupled between the first and second electrical conductors for passing surge currents from one of the electrical conductors to the other of the electrical conductors including arc current extinguishing means for extinguishing arc currents occurring as a result of a failure of the surge current passing means, wherein the arc current extinguishing means includes a fusible material surrounded by electrically nonconductive, thermally conductive particulate matter; and indicating means made of a paper material, disposed between the electrically nonconductive, thermally conductive particulate matter and the transparent area and responsive to heat generated by the arc currents during failure of the surge current passing means for indicating the occurrence of the arc currents within the casing.

2. The secondary surge arrester according to claim 1 wherein the indicating means comprises a heat sensitive material located in close proximity to the casing between the transparent area and the surge current passing means so that the heat sensitive material is viewable through the transparent area.

3. The secondary surge arrester according to claim 2 wherein the heat sensitive material changes color in response to heat generated by the arc currents during a failure of the surge current passing means.

4. The secondary surge arrester according to claim 2 wherein the heat sensitive material burns in response to heat generated by the arc currents during a failure of the surge current passing means.

5. The secondary surge arrester according to claim 2 wherein the fusible material comprises a fuse wire which is located in close proximity to the heat sensitive material.

6. The secondary surge arrester according to claim 5 wherein the surge current passing means comprises a voltage dependent resistive element.

7. The secondary surge arrester according to claim 1 wherein the electrically nonconductive, thermally conductive particulate material comprises sand.

8. A secondary surge arrester comprising:

a casing;

first and second electrical conductors extending through the casing;

surge current passing means located within the casing and coupled between the first and second electrical conductors for passing surge currents from one of the electrical conductors to the other of the electrical conductors including arc current extinguishing means for extinguishing arc currents occurring as a result of a failure of the surge current passing means; and indicating means coupled to the casing and responsive to heat generated by the arc currents during failure of the surge current passing means for indicating the occurrence of the arc currents within the casing;

wherein the casing includes a transparent area and the indicating means comprises a heat sensitive material located in close proximity to the casing between the transparent area and the surge current passing means so that the heat sensitive material is viewable through the transparent area and wherein a piece of pliable material is located between the heat sensitive material and the transparent area.

9. A secondary surge arrester comprising:

a casing;

first and second electrical conductors extending through the casing.;

surge current passing means located within the casing and coupled between the first and second electrical conductors for passing surge currents from one of the electrical conductors to the other of the electrical conductors including arc current extinguishing means for extinguishing arc currents occurring as a result of a failure of the surge current passing means; and indicating means coupled to the casing and responsive to heat generated by the arc currents during failure of the surge current passing means for indicating the occurrence of arc currents within the casing;

wherein the casing includes a transparent area and the indicating means comprises a heat sensitive material located in close proximity to the casing between the transparent area and the surge current passing means so that the heat sensitive material is viewable through the transparent area, wherein the arc current extinguishing means comprises a fusible material surrounded by electrically nonconductive, thermally conductive particulate material such that, in the event of the failure of the surge current passing means resulting in arc current, the fusible material opens and the electrically nonconductive, thermally conductive particulate material extinguishes the arc current and wherein the fusible material comprises a fuse wire which is located in close proximity to the heat sensitive material and a secondary fuse wire connected in parallel with the fuse wire, wherein the secondary fuse wire has a higher resistivity than the fuse wire and is located closer to the heat sensitive material than the fuse wire.

10. A secondary surge arrester comprising:

first and second electrical conductors;

a fault current limiting fuse and an arrester element connected to the first and second electrical conductors such that the arrester element conducts surge currents from one of the first and second electrical conductors to the other of the first and second electrical conductors in response to electrical surges, wherein the fault current limiting fuse comprises a fusible material surrounded by an energy absorbing material;

a ventless casing which includes a transparent area and which encloses the arrester element and the fault current limiting fuse; and a heat sensitive element made of paper and disposed within the ventless casing between the energy absorbing material and the transparent area which responds to heat generated by the fault current limiting fuse during a failure of the arrester element to indicate the operability of the arrester element.

11. The secondary surge arrester according to claim 10 wherein the heat sensitive element comprises a heat sensitive material which is located adjacent the energy absorbing material, which is viewable through the transparent area, and which burns when the energy absorbing material absorbs energy produced by the fault current limiting fuse during a failure of the arrester element.

12. The secondary surge arrester according to claim 10 wherein the heat sensitive element comprises a heat sensitive material which is located adjacent the energy absorbing material, which is viewable through the transparent area, and which changes color when the energy absorbing material reaches a predetermined temperature.

13. The secondary surge arrester according to claim 12 further comprising a piece of pliable material located between the heat sensitive material and the transparent area.

14. The secondary surge arrester according to claim 12 wherein the energy absorbing material comprises sand.

15. The secondary surge arrester according to claim 14 wherein the arrester element is a metal oxide varistor.

16. The secondary surge arrester according to claim 10 wherein the fault current limiting fuse includes a first fuse wire and a second fuse wire which has a higher resistivity than the first fuse wire, which is connected in parallel with the first fuse wire, and which is located closer to the heat sensitive element than the first fuse wire.

17. A secondary surge arrester comprising:

first and second electrical conductors;

a fault current limiting fuse and an arrester element connected to the first and second electrical conductors such that the arrester element conducts surge currents from one of the first and second electrical conductors to the other of the first and second electrical conductors in response to electrical surges;

a ventless casing having a transparent area and which encloses the arrester element and the fault current limiting fuse; and a heat sensitive element which is disposed within the ventless casing near the fault current limiting fuse and which responds to heat generated by the fault current limiting fuse during a failure of the arrester element so as to indicate the operability of the arrester element;

wherein the fault current limiting fuse comprises a fusible material surrounded by an energy absorbing material, the heat sensitive element comprises a heat sensitive material which is located adjacent the energy absorbing material, which is viewable through the transparent area and which includes first and second layers, wherein the first layer becomes transparent to expose the second layer when the heat sensitive material reaches a predetermined temperature.

18. A secondary surge arrester comprising:

first and second electrical conductors;

a fault current limiting fuse and an arrester element connected to the first and second electrical conductors such that the arrester element conducts surge currents from one of the first and second electrical conductors to the other of the first and second electrical conductors in response to electrical surges;

a ventless casing which includes a transparent area, and which encloses the arrester element and the fault current limiting fuse; and a heat sensitive element which is disposed within the ventless casing near the fault current limiting fuse and which responds to heat generated by the fault current limiting fuse during a failure of the arrester element so as to indicate the operability of the arrester element;

wherein the fault current limiting fuse includes a fuse wire which is stressed to fuse at a predetermined location within an energy absorbing material and wherein the heat sensitive element is located adjacent the energy absorbing material which surrounds the predetermined location.

19. A method of assembling a secondary surge arrester comprising the following steps:

matching a voltage dependent resistive element with a fault current limiting fuse having a fusible material surrounded by an energy absorbing material such that the voltage dependent resistive element passes surge currents and the fault current limiting fuse extinguishes arc currents occurring as a result of a failure of the voltage dependent resistive element;

connecting the voltage dependent resistive element and the fault current limiting fuse in series between first and second electrical conductors; and enclosing the voltage dependent resistive element, the fault current limiting fuse, and a heat sensitive material made of paper within a casing having a transparent area such that the heat sensitive material is disposed between the energy absorbing material and the transparent area so that the heat sensitive material responds to heat generated by the fault current limiting fuse during failure of the voltage dependent resistive element in order to indicate the failure of the voltage dependent resistive element.

20. The method of claim 19 wherein the step of matching a voltage dependent resistive element with a fault current limiting fuse comprises the step of matching a voltage dependent resistive element with a fault current limiting fuse having a fusible material surrounded by an energy absorbing material which undergoes a transition of phase in response to the failure of the voltage dependent resistive element.

21. The method of claim 19 wherein the step of matching a voltage dependent resistive element with a fault current limiting fuse comprises the step of matching a voltage dependent resistive element with a fault current limiting fuse having a fusible material surrounded by sand which undergoes a transition of phase in response to the failure of the voltage dependent resistive element.

22. The method of claim 19 wherein the step of matching a voltage dependent resistive element with a fault current limiting fuse comprises the step of providing a fault current limiting fuse which extinguishes arcing produced by a failure of the voltage dependent resistive element before the casing fragments violently.

* * * * *

UNITED STATES PATENT AND TRADEMARK OFFICE

CERTIFICATE OF CORRECTION

PATENT NO. : 5,502,612

DATED : March 26, 1996

INVENTORS : Osterhout et al.

It is certified that error appears in the above-identified patent and that said Letters Patent is hereby corrected as shown below:

Column 1, line 28, "eresters are" should be --arresters are--.

Column 13, line 45, "the casing.;" should be --the casing;--.

Signed and Sealed this

Twenty-seventh Day of August, 1996

Attest:

BRUCE LEHMAN

*Attesting Officer*

*Commissioner of Patents and Trademarks*